United States Patent [19]
Brokering

[11] Patent Number: 5,810,228
[45] Date of Patent: Sep. 22, 1998

[54] SIDE LOADING WATER BOTTLE HOLDER

[76] Inventor: Christopher N. Brokering, 400 Groveland, No. 113, Minneapolis, Minn. 55403

[21] Appl. No.: 820,098

[22] Filed: Mar. 19, 1997

[51] Int. Cl.⁶ .................................................. B62J 7/02
[52] U.S. Cl. ........................................... 224/414; 224/926
[58] Field of Search .................................. 224/414, 425, 224/427, 457, 926; D12/114; 248/311.2

[56] References Cited

U.S. PATENT DOCUMENTS

| | | | |
|---|---|---|---|
| D. 337,288 | 7/1993 | Ringlé | D12/114 |
| 449,460 | 3/1891 | Bannister | 224/414 |
| 478,092 | 7/1892 | Cushman . | |
| 4,193,525 | 3/1980 | Sommers | 224/414 |
| 4,334,642 | 6/1982 | Reisch | 224/414 X |
| 4,345,704 | 8/1982 | Boughton . | |
| 5,011,055 | 4/1991 | Neugent . | |
| 5,115,952 | 5/1992 | Jenkins | 224/414 |
| 5,326,006 | 7/1994 | Giard, Jr. . | |
| 5,390,836 | 2/1995 | Faulds . | |
| 5,673,890 | 10/1997 | Duesterberg | 248/311.2 |

FOREIGN PATENT DOCUMENTS 3641411  6/1988  Germany ................................. 224/926

*Primary Examiner*—Renee S. Luebke
*Attorney, Agent, or Firm*—Haugen & Nikolai, PA

[57] ABSTRACT

The holder has a mounting plate with mounting holes for mounting onto the down tube of a bicycle. The holder includes two bottle receiving members extending transverse from the mounting plate. The first bottle receiving member has a larger arcuate member extending from a first side of the mounting plate and a smaller arcuate member extending from a second side of the mounting plate. The first and second arcuate members define a first opening therebetween. The second bottle receiving member also has a larger arcuate member extending from the first side of the mounting plate. A smaller arcuate member extends from the second side of the mounting plate. These arcuate members define a second opening that is on the same side of the water bottle holder as the first opening. The first bottle receiving member is smaller than said second bottle receiving member. A first alternative embodiment has two sets of mounting holes on its mounting plate. A second alternative embodiment uses a c-clamp bracket for each bottle receiving member.

3 Claims, 12 Drawing Sheets

SIDE LOADING WATER BOTTLE HOLDER

I. FIELD OF THE INVENTION

The present invention relates to a bicycle accessory holder and more particularly to an improved water bottle holder.

II. BACKGROUND OF THE INVENTION

Bicycling is a popular recreational and competitive activity. Bicycling attracts a wide variety of participants and a variety of activities such as family outings, extended touring, commuting, road racing and mountain biking. Bicyclists carry a variety of accessories on their bicycle from tire repair kits to racks holding bags.

An accessory common to most bicycles is a bottle for holding water or other liquids and its associated holder. The water bottle holder commonly consists of a metal cage mounted directly to mounting holes on the bicycle's tubular upright frame. The cage is configured to accept and preferably hold the cylindrical shape of a conventional small sized water bottle with a friction fit. However, larger water bottles are becoming more commonplace. These larger bottles do not fit properly in the conventional cage and have a larger portion extending out of the cage making it easier for them to fall out especially if rough terrain is experienced. Bottles are often not inserted properly in the cage. In such cases, the water bottle can fall out of the cage as the bicyclist transverses rough terrain, common to mountain bicyclists.

The conventional cage holder also requires the bottle to be inserted or removed in a direction generally perpendicular to the bicycle frame to which the cage holder is mounted. The method of lining up the water bottle with the cage opening before inserting can be cumbersome and distracting to the rider. The bicyclist's attention is directed to replacing or removing the water bottle and insuring the water bottle is firmly seated instead of the bicyclist paying attention to the terrain being encountered.

The increase of mountain biking has led to an increase in full suspension frames. These frames have a limited area for carrying a water bottle. Furthermore, many of these new suspension frames cannot accept conventional cages.

Some alternatives to the conventional water bottle cage have incorporated a particular water bottle and cage such as those disclosed in U.S. Pat. Nos. 4,345,704 and 5,326,006. However, these do not address the full suspension frames or the larger sized water bottles.

What is needed is a bottle holder that can be used on a variety of bicycle frames, including those with limited space such as full suspension frames. Furthermore, a need exists for a bottle holder that can accept and securely hold both large sized and small sized conventional water bottles with the bicyclist using a more natural movement when removing or inserting the bottle into the holder.

SUMMARY OF THE INVENTION

The present invention is a bottle holder that is side loading. The bottle holder has a generally rectangular rib with an upper and lower circular member extending in a transverse direction from the rib. The upper circular member is smaller than the lower circular member and is adapted to receive the neck of the conventional water bottle. The lower circular member is adapted to receive the lower portion of a conventional water bottle. The openings of the circular members are located less than half-way around one side of the circular members from the rib. This allows for insertion and removal of the water bottle in a direction lateral to the bottle holder. The rib contains two holes positioned between the two circular members, aligned with conventional mounting holes located on the bicycle tube and a threaded screw is used to secure the bottle holder.

In a first alternative embodiment, the rib extends below the lower circular member. This rib contains two sets of mounting holes, with one set having a hole on each side of the lower circular member.

In a second alternative embodiment, each circular member has an individual mounting bracket. The mounting bracket is positioned opposite the circular member and is a conventional C-clamp.

DESCRIPTION OF THE DRAWINGS

The foregoing features, objects and advantages of the invention will become apparent to those skilled in the art from the following detailed description of the preferred embodiment, especially when considered in a conjunction with the accompanying drawings in which.

DETAILED DESCRIPTION OF THE PREFERRED EMBODIMENT

Figure 1:
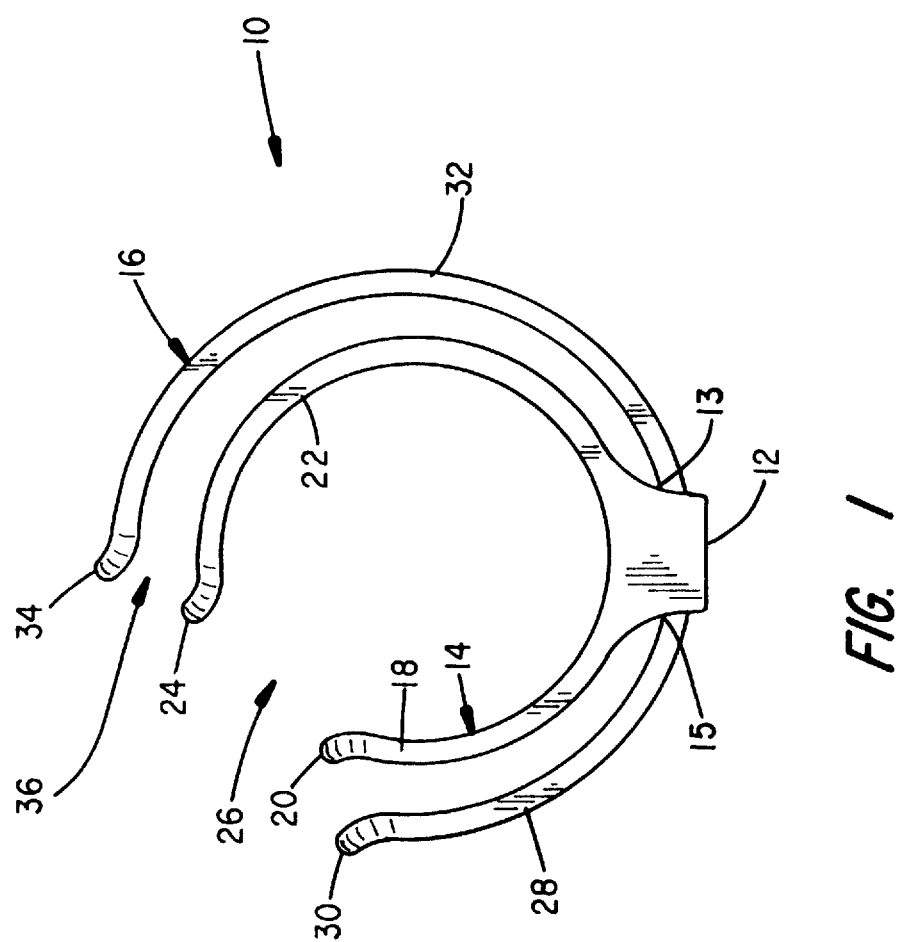
FIG. 1. is a top view of the present invention.
Figure 2:
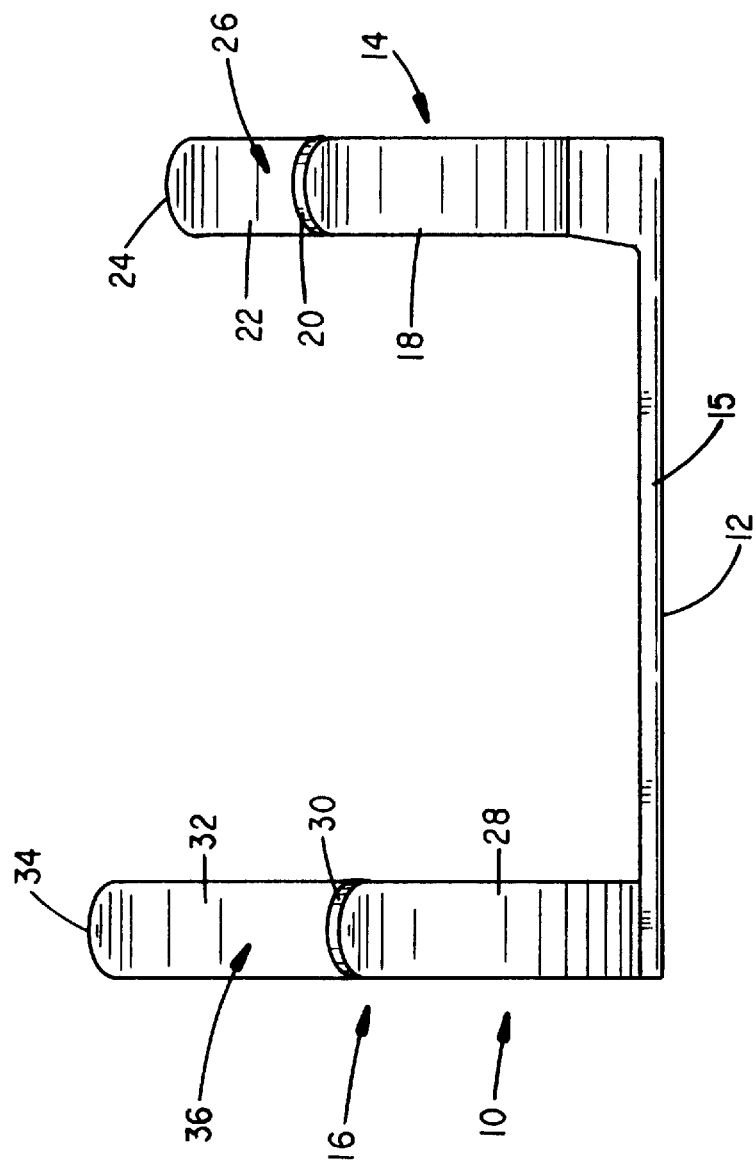
FIG. 2. is an elevational side view of the present invention.
Figure 3:
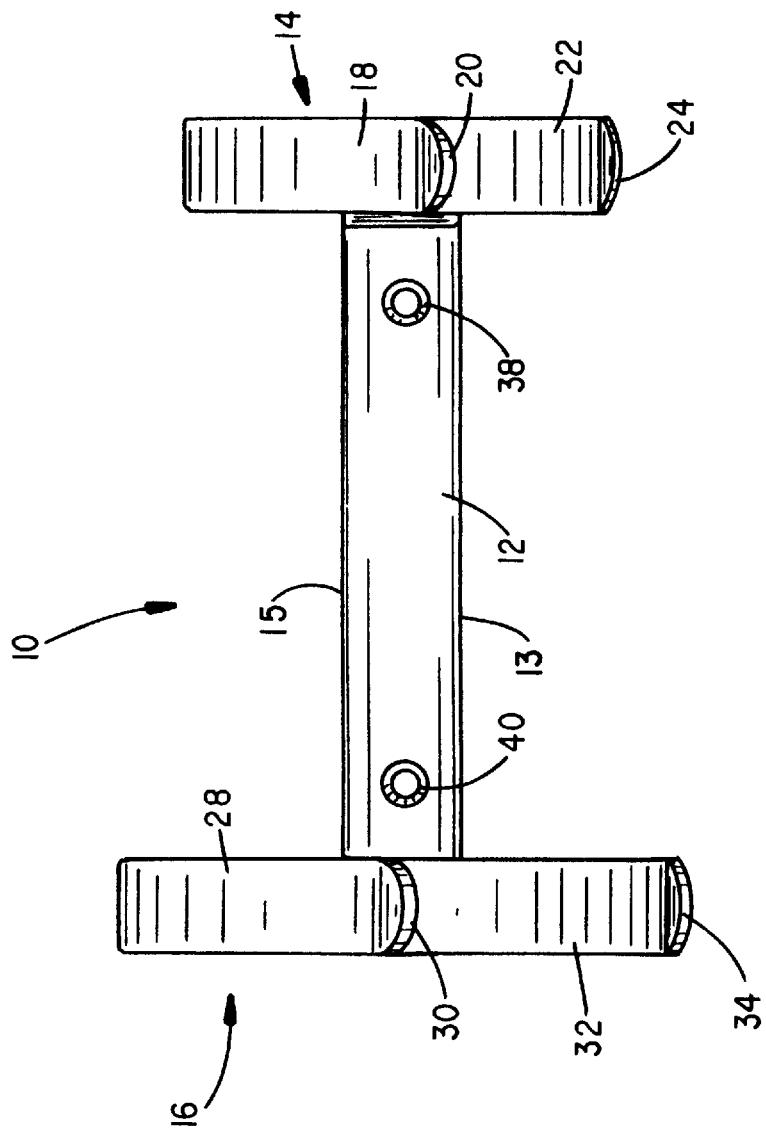
FIG. 3. is an elevational front view of the present invention.
Figure 4:
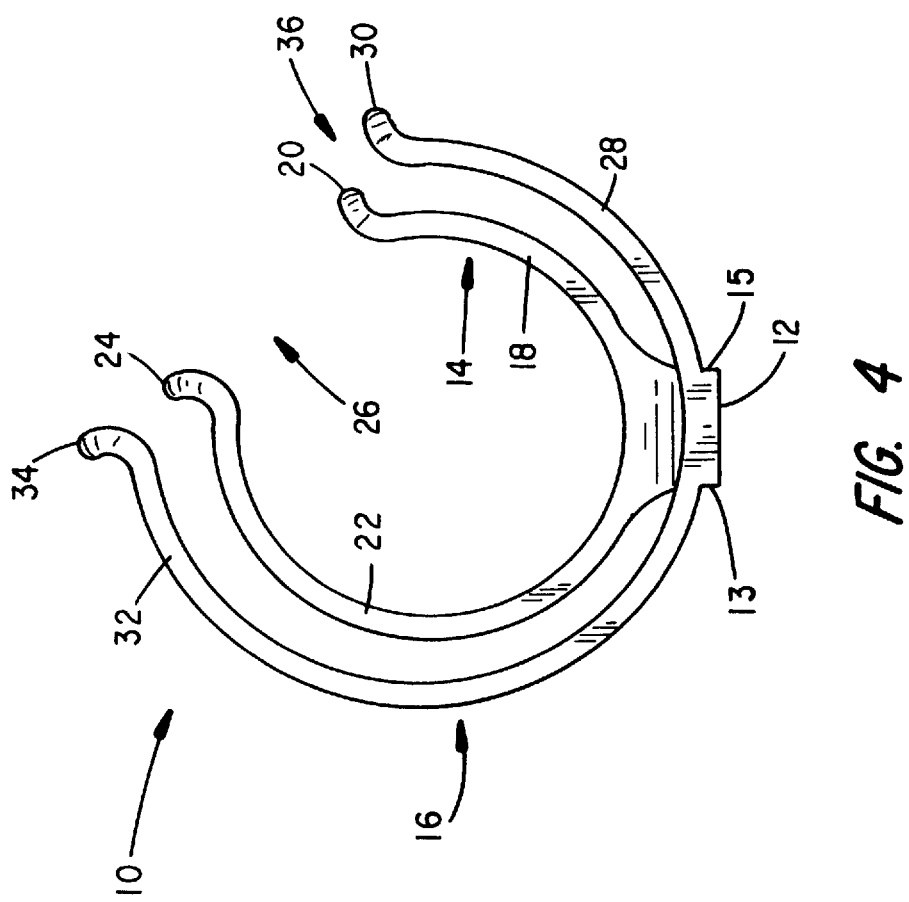
FIG. 4. is a bottom view of the present invention.

The present invention is a side loading water bottle holder for bicycles. As seen in FIGS. 1–4, the water bottle holder 10 consists of an elongated mounting plate 12 with an upper arcuate member 14 and a lower arcuate member 16. The mounting plate 12 has a first side 13 and a second side 15. The upper arcuate member 14 consists of a short arc member 18 having a flared end 20 and a longer arc member 22 having a flared end 34 that define an opening 26. Short arc ember 18 extends from the second side 15 of the mounting plate 12 and the longer arc member 22 extends from the first side 13 of the mounting plate 12. Likewise, the lower arcuate member 16 consists of a short arc member 28 having a flared end 30 and a longer arc member 32 having a flared end 34 that define an opening 36. Short arc mounting members 28 extends from the second side 15 of the mounting plate 12 and longer arc member 32 extends from the first side 13 of the mounting plate 12. The openings 26 and 36 are on the same side of the water bottle holder 10 and spaced apart from one another as shown in FIGS. 1–4. The different arc lengths cause the openings to be offset from a position directly across from a bicycle down tube 108 (see FIGS. 11 and 12) or mounting plate 12. The openings must be sufficiently offset to enable the bicyclist to use a sidewise movement to remove or insert the water bottle. The openings 26 and 36 can be located on the other side of the holder to accommodate bicyclists who prefer to insert their water bottles on the other side. That is, the longer the arc members 22 and 32 can extend from the second side 15 of mounting plate 12 and the short arc members 18 and 28 can extend from the first side 13 of mounting plate 12. The holder 10 is preferably an integrally molded device made out of a suitable carbon fiber material, but can be made out of any suitable resilient light weight material. As seen in FIG. 3, the mounting plate 12 has two countersunk holes 38 and 40 for mounting the holder 10 to conventional threaded bosses (not shown) brazed on a bicycle down tube (not shown).

Figure 5:
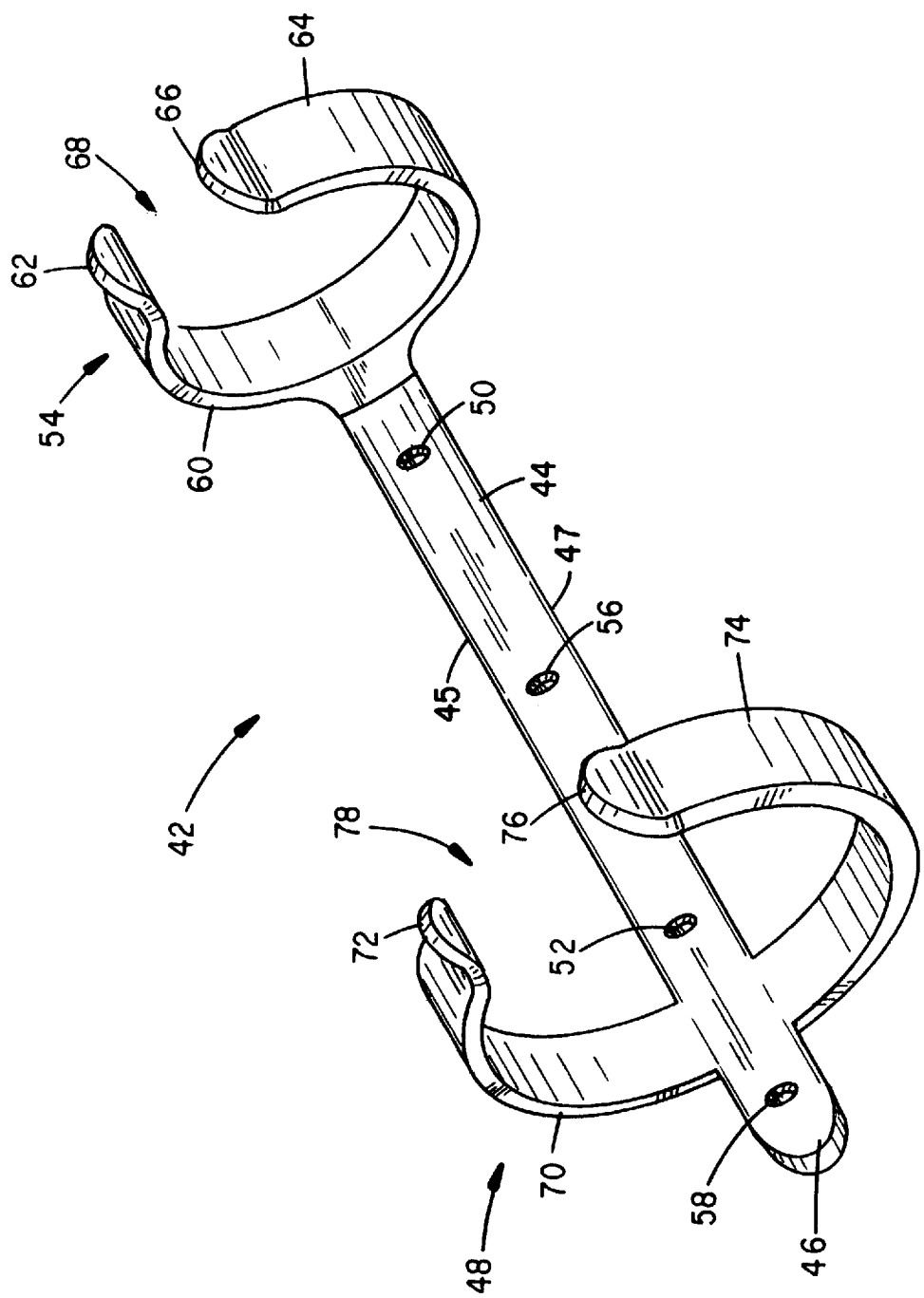
FIG. 5. is a perspective view of a first alternative embodiment.
Figure 6:
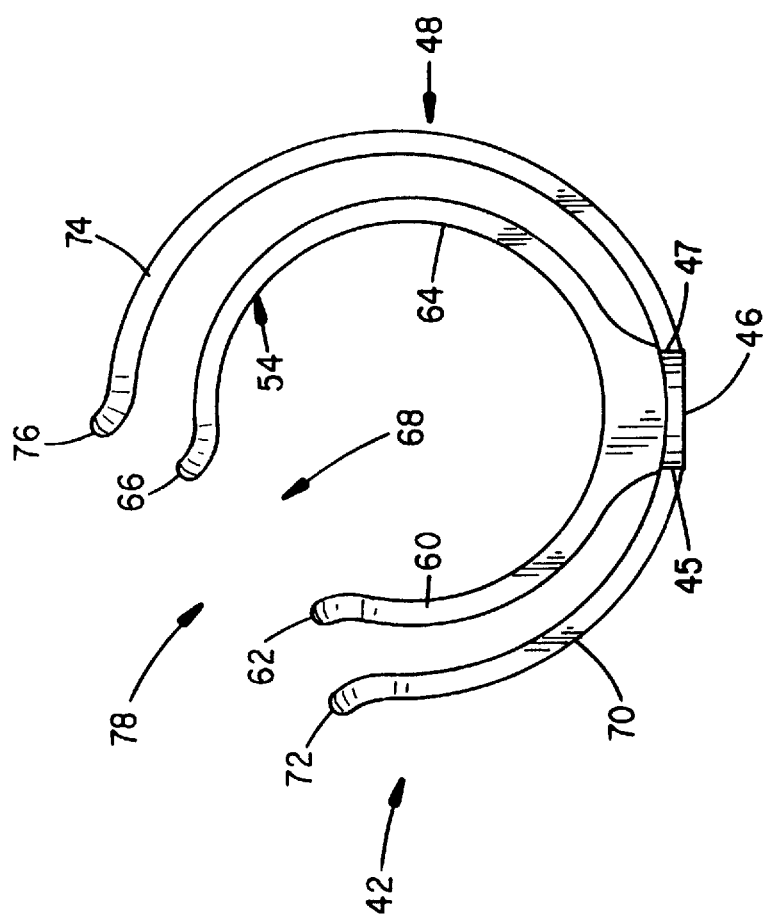
FIG. 6. is a top view of the first alternative embodiment.

In a first alternative embodiment, designated 42 in FIGS. 5 and 6, mounting plate 44 is elongated with a portion 46 extending past the lower arcuate member 48. The elongated mounting plate 44 contains two sets of mounting holes. The first set consists of mounting holes 50 and 52 and is located between the two arcuate members 48 and 54. The second set consists of mounting holes 56 and 58 and has one hole 56 located between the first set of holes and a second hole 58 located on portion 46 of the mounting plate 44.

The upper arcuate member 54, like the upper arcuate member 14 of the first embodiment 10, has a short arc member 60 with a flared end 62 and a longer arc member 64 with a flared end 66 that define an opening 68. Likewise, lower arcuate member 48 has a short arc member 70 with a flared end 72 and a longer arc member 74 with a flared end 76 that define an opening 78. The short arc members 60 and 70 extend from a first side 45 of mounting plate 44 and the longer arc members 64 and 74 extend from a second side 47 of mounting plate 44. As with holder 10, holder 42 can be made with openings 68 and 78 on the opposite side.

Figure 7:
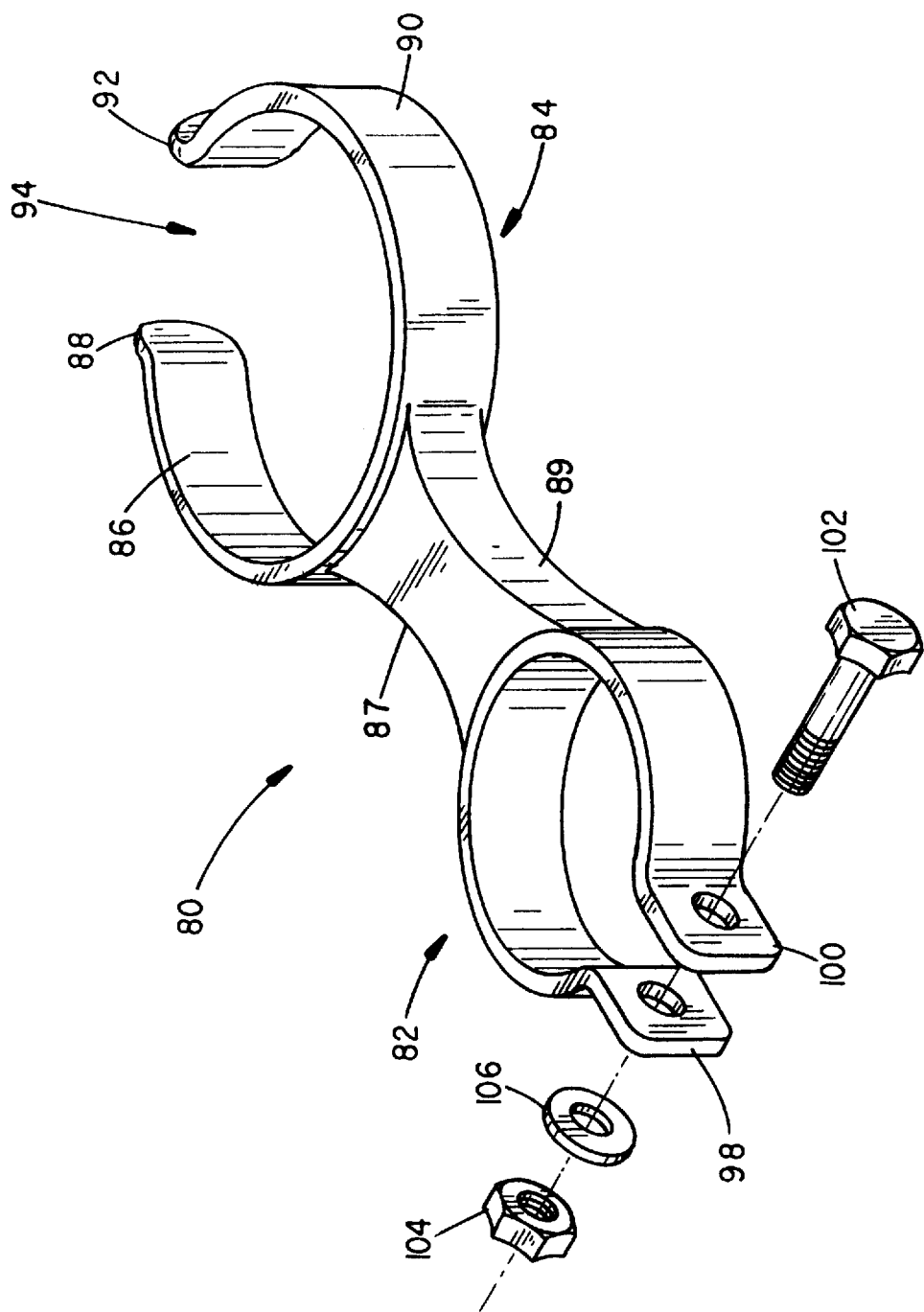
FIG. 7. is a partially exploded perspective view of a second alternative embodiment.
Figure 8:
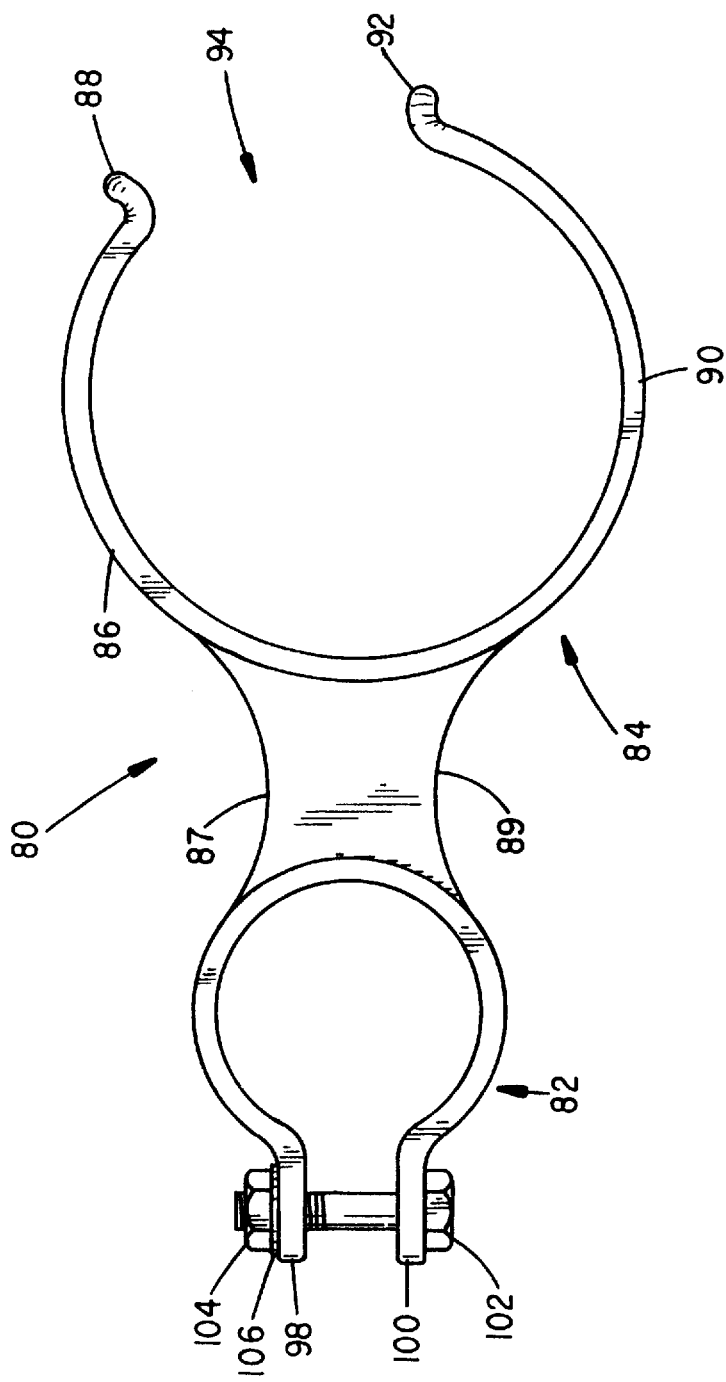
FIG. 8. is a top view of the second alternative embodiment.
Figure 9:
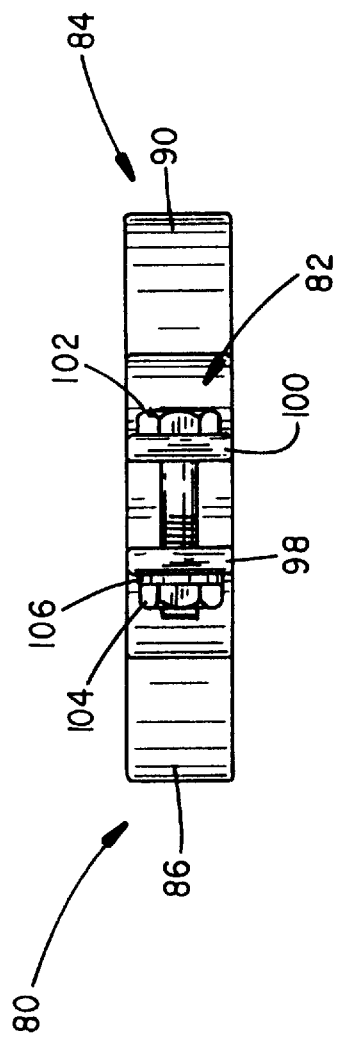
FIG. 9. is a rear elevational view of the second embodiment.
Figure 12:
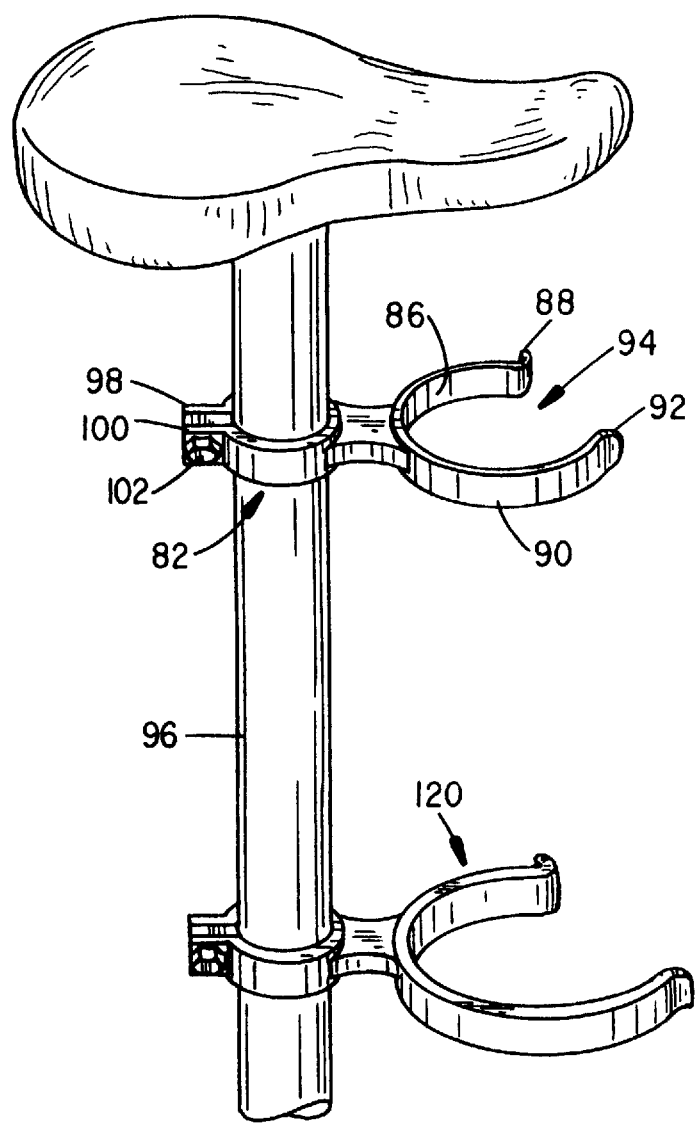
FIG. 12. is a perspective view of the second alternative embodiment mounted on a bicycle seat tube.

FIGS. 7–9 show a second alternative embodiment 80. In this embodiment, a C-clamp type bracket 82 is preferably molded to an arcuate member 84. The arcuate member 84 includes a short arcuate member 86 with a flared end 88 and a long arcuate member 90 with a flared end 92 that define an opening 94. Short arcuate member 86 extends from a first side 87 of the bracket 82 and long arcuate member 90 extends from a second side 89 of the bracket 82. The C-clamp bracket 82 surrounds the down tube 96 as shown in FIG. 12 and contains two flanges 98 and 100 which receive a bolt 102 therethrough. A nut 104 and washer 106 is positioned on the end of the bolt for tightening the C-clamp bracket. The arcuate member 84 can be a smaller size comparable to the upper arcuate members 14 and 54 of holders 10 and 42 or a larger size comparable to the size of lower arcuate members 16 and 48 of holders 10 and 42.

Figure 10:
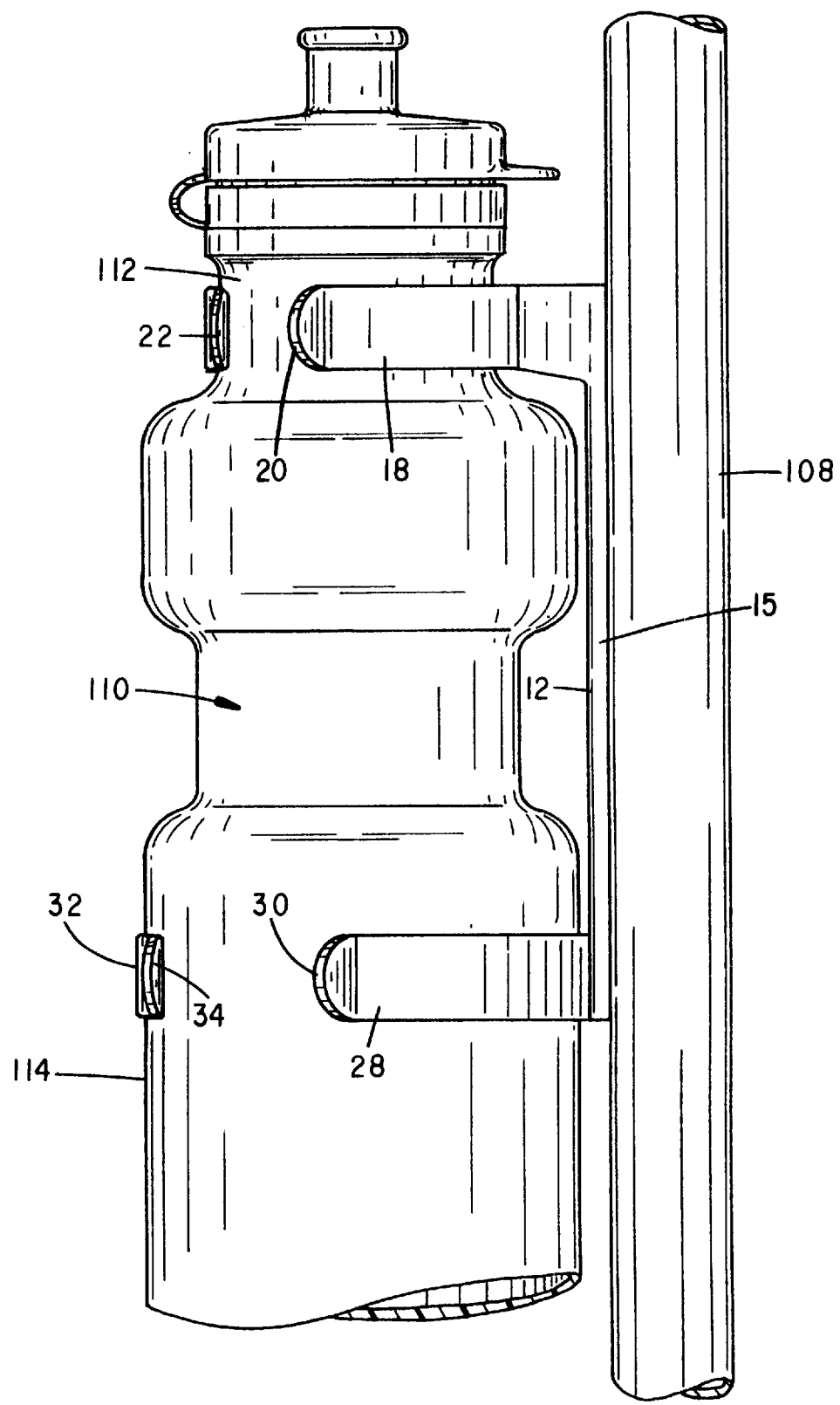
FIG. 10. is a side elevational view of the first embodiment shown with a large sized water bottle.
Figure 11:
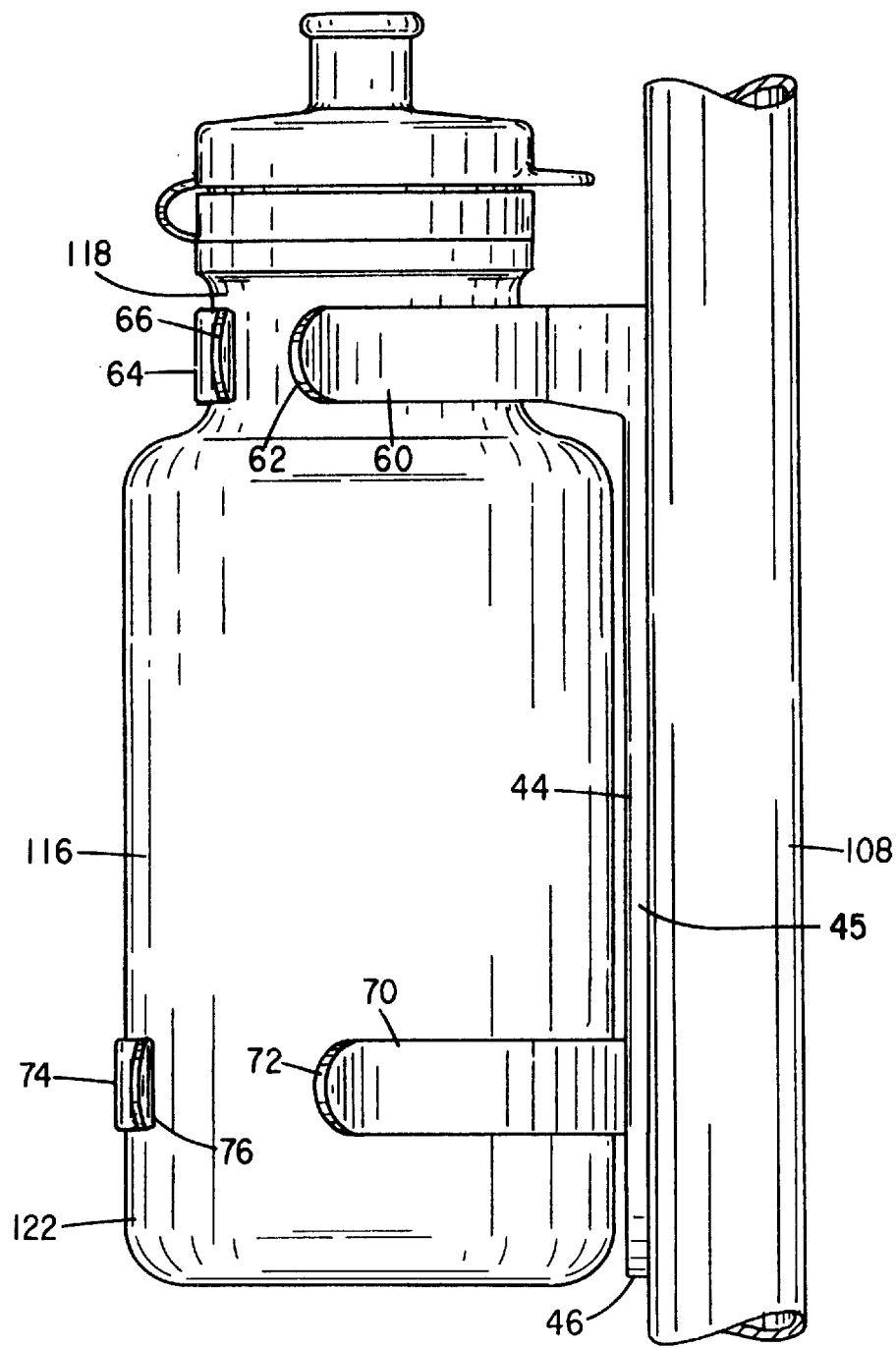
FIG. 11. is a side elevational view of the first embodiment shown holding a small water bottle.

In use, the holders 10 and 42 are mounted to the conventional bosses (not shown) on the bicycle frame 108 as seen in FIGS. 10 and 11. The openings 26 and 36 and 68 and 78 are positioned on the side the bicyclist is most comfortable with inserting and removing the bottle. With the second embodiment 42, the user selects which set of mounting holes to use. The holder 80 is mounted with the c-clamp surrounding the down tube 96 as shown in FIG. 12. This holder can be positioned at other suitable locations on the bicycle frame. Two holders are preferably used, as shown in FIG. 12, with holder 120 sized larger to surround the lower portion of a water bottle.

Two conventional bottle sizes are shown in FIGS. 10 and 11 secured in the holder. FIG. 10 shows a conventional large sized bottle 110 with the upper arcuate member 14 surrounding an upper indented portion 112 of the bottle 110 and the lower arcuate member 16 surrounding the area of the bottle adjacent the lower end 114 of the bottle. The middle indented portion of the bottle may alternatively be positioned in the upper arcuate member 14. FIG. 11 shows holder 42 with a smaller sized conventional water bottle 116. In this arrangement, the upper arcuate member 54 surrounds the neck portion 118 of the bottle 116 and the lower arcuate member 48 is positioned about the lower end 122 of the water bottle 116. The bottle is held in the holder with a friction fit. As indicated, the bicyclist uses an efficient side movement to quickly insert the bottle without requiring the bottle be lined up vertically and then inserted all the way down into the conventionally known water bottle cages. The flared edges guide the bottle into the upper and lower arcuate members which flex to receive the bottle and then snap around the bottle to securely hold it. Likewise the bottle is easily removed without the need to lift the bottle vertically and then out of the cage.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and details and operating procedures, can be accomplished without departing from the scope of the invention itself.

I claim:

1. A bottle holder for use with a bicycle, said bottle holder comprising:

(a) a mounting plate including a pair of mounting holes for mounting said plate to said bicycle, said mounting plate having a first end, a second end, a first side and a second side;

(b) a first bottle receiving member extending transverse from said mounting plate approximate said first end, said first bottle receiving member comprising a first arcuate member extending from said first side of said mounting plate and a second arcuate member extending from said second side of said mounting plate, said second arcuate member having an arcuate length shorter than said first arcuate member whereby said first and second arcuate members define a first opening therebetween; and (c) a second bottle receiving member extending transverse from said mounting plate approximate said second end, said second bottle receiving member comprising a third arcuate member extending from said first side of said mounting plate and a fourth arcuate member extending from said second side of said mounting plate, said fourth arcuate member having an arcuate length shorter than said third arcuate member whereby said third and fourth arcuate members define a second opening therebetween.

2. A bottle holder of claim 1, wherein said mounting plate includes a second pair of mounting holes.

3. A bottle holder of claim 1 wherein said first bottle receiving member is smaller than said second bottle receiving member.

\* \* \* \* \*